(12) United States Patent
Kim et al.

(10) Patent No.: US 11,186,675 B2
(45) Date of Patent: Nov. 30, 2021

(54) EPOXY RESIN COMPOSITION AND TRANSFORMER COMPRISING THE SAME

(71) Applicant: LSIS CO., LTD., Anyang-si (KR)

(72) Inventors: Sang-Eon Kim, Anyang-si (KR);
Wook-Dong Cho, Anyang-si (KR);
Heon-Seop Song, Anyang-si (KR);
Tae-Yun Kang, Anyang-si (KR);
Han-Gil Kim, Anyang-si (KR);
Hyeon-Jeong Choi, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 724 days.

(21) Appl. No.: 15/997,224

(22) Filed: Jun. 4, 2018

(65) Prior Publication Data

US 2019/0169358 A1    Jun. 6, 2019

(30) Foreign Application Priority Data

Dec. 1, 2017  (KR) .................. 10-2017-0163980

(51) Int. Cl.
*H01F 27/32* (2006.01)
*C08G 59/22* (2006.01)
(Continued)

(52) U.S. Cl.
CPC .......... *C08G 59/686* (2013.01); *C08G 59/22* (2013.01); *C08G 59/4215* (2013.01);
(Continued)

(58) Field of Classification Search
CPC .. H01F 27/32; H01F 27/327; H01F 2027/329; C08G 59/22; C08G 59/42; C08G 59/4284; C08G 59/686; C08L 63/00
(Continued)

(56) References Cited

U.S. PATENT DOCUMENTS

2005/0004270 A1* 1/2005 Rocks ................ C08G 59/4215
                                                 523/400
2010/0018750 A1   1/2010 Schaal et al.
(Continued)

FOREIGN PATENT DOCUMENTS

CN    101663344 A    3/2010
JP    H07288038 A    10/1995
(Continued)

OTHER PUBLICATIONS

Machine translation of KR-101447040-B1 (no date).*
(Continued)

*Primary Examiner* — Michael J Feely
(74) *Attorney, Agent, or Firm* — K&L Gates LLP

(57) ABSTRACT

The disclosure describes an epoxy resin composition and a transformer including the same. The epoxy resin composition according to an embodiment of the present invention includes an epoxy resin having a glycol-based functional group in a main chain, a filler, a curing agent, and an imidazole-based catalyst, and the transformer according to an embodiment includes an insulated conductor wound in multiple layers in a vertical direction; a semi-conductive layer which is provided on the insulated conductor and disperses a concentrated electric field; and an insulator which is casted on the insulated conductor and the semi-conductive layer and forms an outer shape of the transformer, and the insulator consists of the epoxy resin composition including the epoxy resin having the glycol-based functional group in the main chain, the filler, the curing agent, and the imidazole-based catalyst.

10 Claims, 2 Drawing Sheets

(51) Int. Cl.
  *C08G 59/42* (2006.01)
  *C08G 59/68* (2006.01)
  *C08L 63/00* (2006.01)
  *H01F 27/34* (2006.01)
  *C09K 5/14* (2006.01)
  *C08K 5/00* (2006.01)
  *C08K 5/3445* (2006.01)
  *C08K 3/013* (2018.01)
  *C08K 3/00* (2018.01)
  *C08K 3/36* (2006.01)

(52) U.S. Cl.
  CPC ............ *C08G 59/4238* (2013.01); *C08K 3/00* (2013.01); *C08K 3/013* (2018.01); *C08K 5/0025* (2013.01); *C08K 5/3445* (2013.01); *C09K 5/14* (2013.01); *H01F 27/327* (2013.01); *H01F 27/34* (2013.01); *C08K 3/36* (2013.01); *C08K 2201/001* (2013.01); *H01F 2027/329* (2013.01)

(58) Field of Classification Search
  USPC ........................................................ 523/461
  See application file for complete search history.

(56) References Cited

U.S. PATENT DOCUMENTS

| | | | |
|---|---|---|---|
| 2012/0202918 A1* | 8/2012 | Singh | ................ C08G 59/4284 523/200 |
| 2017/0047142 A1 | 2/2017 | Disson et al. | |

FOREIGN PATENT DOCUMENTS

| | | | | |
|---|---|---|---|---|
| JP | 2000198906 | A | 7/2000 | |
| JP | 2003342355 | A | 12/2003 | |
| JP | 2006299093 | A | 11/2006 | |
| JP | 2007138002 | A | 6/2007 | |
| JP | 2008140668 | A | 6/2008 | |
| JP | 2008182020 | A | 8/2008 | |
| JP | 2008231439 | A | 10/2008 | |
| JP | 2010132793 | A | 6/2010 | |
| JP | 2010185051 | A | 8/2010 | |
| JP | 2011084597 | A | 4/2011 | |
| JP | 2012069425 | A | 4/2012 | |
| JP | 2013155346 | A | 8/2013 | |
| JP | 2014520903 | A | 8/2014 | |
| JP | 2014189613 | A | 10/2014 | |
| JP | 2015013950 | A | 1/2015 | |
| KR | 20100014721 | | 2/2010 | |
| KR | 20100131294 | A | 12/2010 | |
| KR | 101447040 | B1 * | 10/2014 | ............. H01F 27/08 |
| WO | 2017/164238 | A1 | 9/2017 | |

OTHER PUBLICATIONS

Japanese Office Action for related Japanese Application No. 2018-105085; action dated Jun. 11, 2019; (7 pages).
Korean Office Action for related Korean Application No. 10-2017-0163980; action dated Jan. 11, 2021; (4 pages).
Chinese Office Action for related Chinese Application No. 201810576372.7; action dated Jan. 26, 2021; (8 pages).
Korean Notice of Allowance for related Korean Application No. 10-2017-0163980; action dated Jul. 8, 2021; (2 pages).

* cited by examiner

EPOXY RESIN COMPOSITION AND TRANSFORMER COMPRISING THE SAME

CROSS-REFERENCE TO RELATED APPLICATION

Pursuant to 35 U.S.C. § 119(a), this application claims the benefit of earlier filing date and right of priority to Korean Application No. 10-2017-0163980, filed on Dec. 1, 2017, in the Korean Intellectual Property Office, the disclosure of which is hereby incorporated by reference in its entirety.

BACKGROUND

1. Field of the Invention

The present invention relates to an epoxy resin composition and a transformer including the same, and more particularly, to an epoxy resin composition capable of greatly shortening a curing time and greatly reducing a process time, and a transformer including the same.

2. Description of Related Art

A transformer is a device that changes a voltage or electric current value of an alternating current by using an electromagnetic induction phenomenon. It is the most important equipment for electrical installations used to boost for improving transmission efficiency when supplying it from an electric power company to a user, or to drop a power which is transmitted to meet the voltage which will be used by a consumer.

These transformers are installed in a substation or on a power receiving side of large power consumers and have the rated voltages of several tens of kilovolts or more, for example a dry type transformer, an oil immersed transformers, and a mold transformer.

Here, the oil immersed transformer is a transformer that is not suitable for indoor use since it has a high rated voltage, but it uses oil that can cause an environmental pollution as an insulating material and has a risk of fire and explosion.

The dry type transformer is an air-insulated transformer, and the risk of fire and explosion is lower than that of the oil immersed transformer, but the rated voltage thereof is low and its use as a relatively low capacity transformer is limited.

The mold transformer is an environment-friendly transformer that insulates an outside of a winding for transformation with a solid insulator and does not use oil that can cause the environmental pollution as an insulator. It uses insulation such as epoxy excellent in flame retardancy as the solid insulator, and the risks of fire and explosion are minimized and outdoor and indoor installations are possible and the demand thereof is increasing.

However, in the mold transformer according to the related art, a method of raising a curing temperature or increasing an amount of catalyst is used for shortening the process of the epoxy composition used as the solid insulator, but when the curing temperature is increased, due to a curing contraction by a rapid curing reaction, a crack can be generated in the transformer.

Further, even in the case of the method of increasing the amount of catalyst, a curing rate is accelerated due to a rapid initial heat generation, and the same phenomenon as increasing the curing temperature is generated. This shortens a gelation time, which is a measure of time to retain a liquid form, thereby causing a difficulty in a mold process.

SUMMARY OF THE INVENTION

Accordingly, it is an object of the present invention to provide an epoxy resin composition which is improved in crack resistance and can significantly shorten a curing time in a manufacturing of a transformer.

In addition, it is another object of the present invention to provide an epoxy resin composition which does not require a plasticizer for a crack suppression.

In addition, it is still another object of the present invention is to provide a transformer including the insulator made of the epoxy resin composition which is excellent in crack resistance and formability and can significantly shorten the process time by shortening the curing time.

An epoxy resin composition according to the present invention to achieve these objects includes an epoxy resin having a glycol-based functional group in a main chain; a filler for an electrical insulation and a thermal conduction; a curing agent for curing the epoxy resin; and an imidazole-based catalyst, and includes a flexible (plasticized) functional group such as a glycol-based functional group in the epoxy main chain and has a resistance to stress generated during curing, and after the temperature is increased by using the imidazole-based catalyst, a reaction rate is rapid, thereby significantly shortening the curing time of the epoxy resin composition.

In addition, the transformer according to the present invention includes an insulated conductor wound in multiple layers in a vertical direction; a semi-conductive layer which is provided on the insulated conductor and disperses a concentrated electric field; and an insulator which is casted on the insulated conductor and the semi-conductive layer and forms an outer shape of the transformer, and the insulator consists of an epoxy resin composition including the epoxy resin having the glycol-based functional group in the main chain, the filler, the curing agent, and the imidazole-based catalyst.

According to the present invention as described above, there are the advantages that it is possible to add a flexible functional group in the epoxy main chain to impart the resistance to stress generated during curing, and to lower a glass transition temperature, thereby improving a heat resistance in a long term.

Further, according to the present invention, since the plasticizer for improving the crack resistance is not included, it is possible to promote an effect of reducing the process cost, and after molding the epoxy resin composition, the curing time can be significantly shortened, thereby significantly increasing a production amount of the epoxy resin composition.

DETAILED DESCRIPTION OF EXEMPLARY EMBODIMENTS

Figure 1:
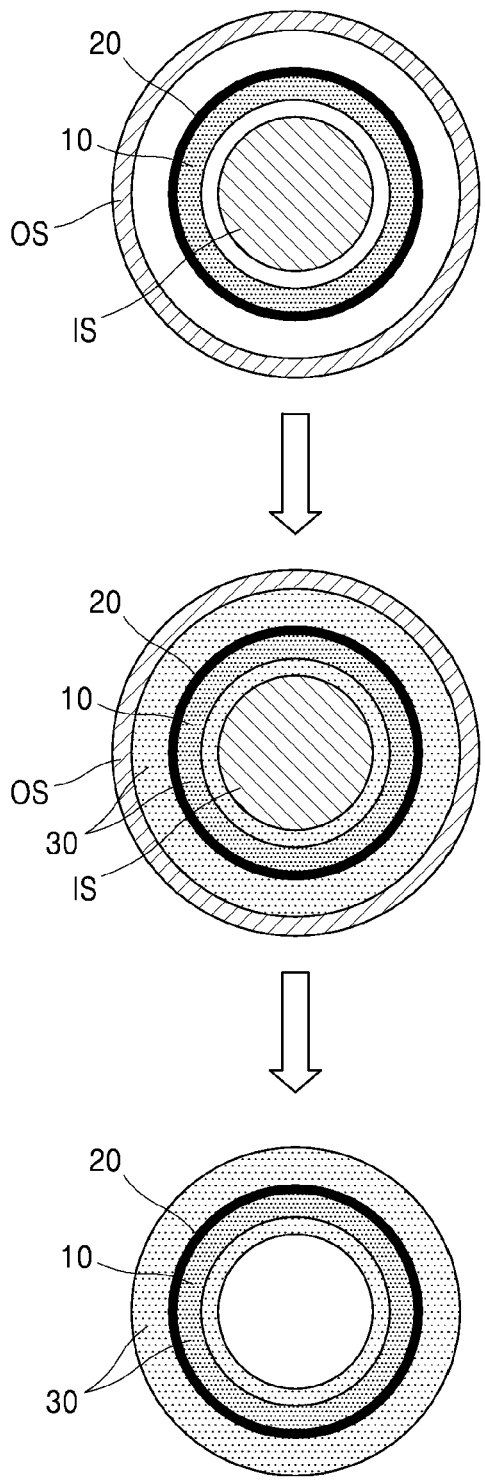
FIG. 1 is a schematic view showing a process for manufacturing a transformer including an epoxy resin composition in accordance with an exemplary embodiment of the present invention.
Figure 2:
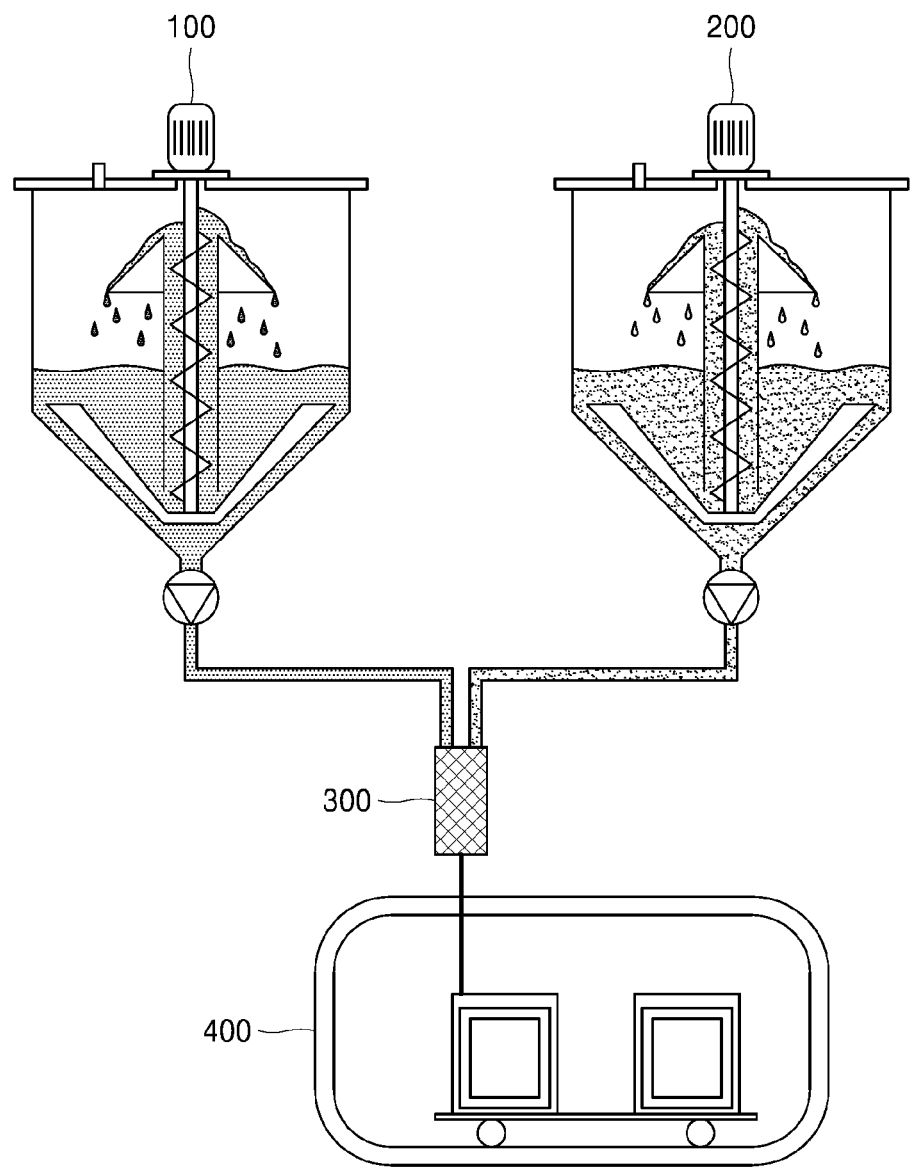
FIG. 2 is a schematic view showing a method for preparing an epoxy resin composition in accordance with an exemplary embodiment of the present invention.

The above mentioned objects, features and advantages will be described below in detail with reference to the accompanying drawings. Accordingly, those skilled in the art to which the present invention pertains will easily perform the technical idea of the present invention. In describing the present invention, when it is considered that the specific description with regard to the known technology related to the present invention may obscure the gist of the present invention unnecessarily, the detailed description thereof will be omitted. Hereinafter, the preferred embodiments according to the present invention will be described in detail with reference to the accompanying drawings. In the drawings, the same reference numerals are used to indicate the same or similar components.

The present invention provides an epoxy resin composition including an epoxy resin having a glycol-based functional group in a main chain, a filler, a curing agent, and an imidazole-based catalyst.

The epoxy resin composition according to the present invention does not need to increase a curing temperature or increase an amount of a catalyst in order to shorten a process time, unlike the method of preparing an epoxy resin composition consisting of an epoxy resin synthesized from conventional bisphenol A or bisphenol F as a raw material.

That is, in the conventional epoxy resin composition, the curing temperature rise and the amount of catalyst increase are used as described above in order to shorten the process time. However, the epoxy resin composition produced by this method has the problems of a degradation of a crack resistance and a heat resistance and a formability.

Specifically, the epoxy resin composition according to the present invention does not need to use a plasticizer for a crack suppression by using an epoxy resin having a glycol-based functional group in the epoxy main chain and using an imidazole-based catalyst. It is possible to shorten the curing time in half without causing a problem that the conventional epoxy resin composition has, and thus the production amount can be significantly improved.

Hereinafter, the epoxy resin composition according to the present invention will be specifically described.

The epoxy resin composition according to the present invention includes the epoxy resin having the glycol-based functional group in the main chain, and the epoxy resin has a molecular weight per equivalent of 300 to 400. The above epoxy resin has a molecular weight in the above-mentioned range, so that a flexibility of the epoxy resin is improved, a viscosity is lowered, and an elongation ratio of the epoxy resin is finally improved, and thus, the crack resistance is improved after preparation.

In addition, in the epoxy resin composition according to the present invention, the epoxy resin may have a glycol-based functional group in the main chain. Examples of such functional group may have at least one repeating unit selected from the group consisting of methyl glycol, ethyl glycol, butyl glycol and propyl glycol having 2 or more and less than 6 carbon atoms.

As described above, the epoxy resin composition according to the present invention has an advantage that the crack resistance is improved by using the epoxy resin having the glycol-based functional group in the main chain and it is not necessary to use the plasticizer contained in the conventional epoxy resin composition.

In particular, the present invention does not lower the glass transition temperature as compared with the conventional epoxy resin composition including a conventional plasticizer, and thus, does not cause a problem of degradation of heat resistance.

It is preferable that the epoxy resin is contained in an amount of 15 to 25% by weight based on the total weight of the epoxy resin composition. When the epoxy resin is included as less than 15% by weight, the crack resistance and the heat resistance of the epoxy resin composition are degraded. When it exceeds 25% by weight, its formability is degraded.

In the epoxy resin composition according to the present invention, the filler is used for an electrical insulation and a thermal conduction. Quartz, molten silica, natural silica, synthetic silica, natural aluminum oxide, synthetic aluminum oxide, aluminum trihydroxide, magnesium hydroxide, aluminum hydroxide, boron nitride, aluminum nitride, silicon nitride, silicon carbide, a mica, zinc oxide, etc., can be used as the filler.

It is preferable that the filler is comprised in an amount of 30 to 70% by weight of the total weight of the epoxy resin composition, and can exhibit the electrical insulation and the thermal conductivity suitable for the epoxy resin composition within the above-mentioned range.

In addition, the epoxy resin composition according to the present invention includes a curing agent. The curing agent is used for curing the epoxy resin. Methyl tetrahydrophthalic anhydride (MeTHPA), methyl hexahydrophthalic anhydride (MeHHPA), and nadic-methyl anhydride (NMA), etc. can be used.

It is preferable that the curing agent is comprised in an amount of 10 to 20% by weight based on the total weight of the epoxy resin composition, and a curing reaction of the epoxy resin can be completed within the above mentioned range.

In the epoxy resin composition according to the present invention, a curing rate of the imidazole-based catalyst is slow in a low-temperature initial molding process, and subsequently, a curing rate of that is high at a high temperature for a forming, thereby improving an overall curing rate.

1-imidazole, 1-vinylimidazole, 1-ethylimidazole, 2-methylimidazole, 1-benzyl-phenylimidazole, 2-ethyl-4-methylimidazole, and 1-cyanoethyl-2-ethyl-4-methylimidazole, etc. can be used as the imidazole-based catalyst.

It is preferable that the imidazole-based catalyst is comprised in an amount of 0.001 to 0.1% by weight based on the total weight of the epoxy resin composition. If the catalyst content is less than 0.001% by weight, the curing rate cannot be shortened. If it exceeds 0.1% by weight, there is the problem that the curing rate is greatly increased in the initial molding process, thereby lowering the crack resistance.

In addition, the present invention provides a transformer, comprising:

an insulated conductor wound in multiple layers in a vertical direction;

a semi-conductive layer provided on the insulated conductor and dispersing a concentrated electric field; and an insulator casted on the insulated conductor and the semi-conductive layer and forming an outer shape of a transformer, the insulator consists of an epoxy resin composition including an epoxy resin having a glycol-based functional group in a main chain, a filler, a curing agent, and an imidazole-based catalyst.

FIG. 1 is a schematic view showing a transformer in accordance with an exemplary embodiment of the present invention.

Referring to FIG. 1, the transformer according to the present invention is manufactured including an insulator forming step, a curing step, and a releasing step. The insulator forming step is formed by putting a molten insulator 30 at the corresponding spacing part, i.e. between the semi-conductive layer 20, the insulated conductor 10, and the mold (IS, OS).

The insulator melted between the semi-conductive layer 20 and the insulated conductor 10, and the molds (IS and OS) is cured by the curing step and is subjected to the release step which takes the mold off to obtain the completed transformer.

Here, the transformer includes an insulated conductor 10, a semi-conductive layer 20, and an insulator 30. The insulator 30 consists of an epoxy resin composition including the epoxy resin having the glycol-based functional group in the main chain, the filler, the curing agent, and the imidazole-based catalyst, as described above.

The insulated conductor 10 may be composed of a single layer in a horizontal direction of the transformer (thickness direction of the transformer), and the insulated conductor 10 may include an electrically conductive part and an insulated coating layer of an insulating film or nonwoven fabric wound on the electrically conductive part.

The semi-conductive layer 20 is provided on the insulated conductor 10 of a layer of at least upper part or lower part of the insulated conductor 10 to uniformly disperse the concentrated electric field.

The semi-conductive layer 20 is a layer formed of a polymer resin mixed with carbon black. Since the polymer resin has the electric insulation and the carbon black has the conductivity, it is made of a layer having the semi-conductive properties by mixing these materials.

As described above, the insulator 30 includes the epoxy resin having the glycol-based functional group in the main chain, the filler, the curing agent, and the imidazole-based catalyst so that it is not necessary to use the plasticizer for the crack suppression. It is possible to shorten the curing time in half without causing a problem that the conventional epoxy resin composition has, and thus, the production amount can be greatly improved.

For reference, the transformer specifically refers to a mold transformer, and the mold transformer may be named as a dry type transformer or a casting resin transformer.

Example 1: Preparation of Epoxy Resin Composition

An epoxy resin having a glycol-based functional group in a main chain is placed in a first vacuum pre-mixer 100, a curing agent and a catalyst are placed in a second vacuum pre-mixer 200, and then a filler was pre-stirred in the first pre-mixer and the second vacuum pre-mixer and mixed in a static mixer 300.

Thereafter, the mixture mixed in the static mixer is injected into a mold including a coil in a vacuum oven 400. After the injection, it is defoamed for about 1 hour and then moved to a curing furnace and a curing is performed for about 23 hours at 80° C. to 130° C. At this time, a curing time can change a temperature according to a specification of the curing furnace.

At this time, an ethylene glycol epoxy was used as an epoxy resin having a glycol-based function group in the main chain and was mixed to be 22.01% by weight based on the total weight of the epoxy resin composition.

In addition, nadic-methyl anhydride (NMA) as a curing agent was mixed to be 13.43% by weight based on the total weight of the epoxy resin composition, and 1-methyl imidazole was used as a catalyst and mixed to be 0.06% by weight, and as the filler, silica was used, and mixed to be 64.50% by weight.

Table 1 below shows a gelatin time according to a temperature of the imidazole-based catalyst used in the present invention.

TABLE 1

| catalyst | gelation time (min) | | | |
|---|---|---|---|---|
| | 140° C. | 120° C. | 100° C. | 80° C. |
| 1MZ | 2.55 | 4.54 | 12.31 | 59.48 |
| 1VZ | 2.13 | 3.42 | 7.46 | 30.01 |
| 1EZ | 1.32 | 3.51 | 8.2 | 35.5 |
| 1B2PZ | 1.32 | 3.09 | 5.4 | 16.18 |

As shown in above Table 1, it can be seen that the imidazole-based catalyst used in the epoxy resin composition according to the present invention has a long gelation time at a low temperature and a short gelation time at a high temperature.

That is, the imidazole-based catalyst used in the epoxy resin composition according to the present invention is advantageous for initial molding process, and the curing time of the epoxy resin composition can be shortened by half.

Example 2: Preparation of Mold Transformer Made of Insulator Including Epoxy Resin Composition The epoxy resin composition prepared in above Example 1 was injected in a molten state between a semi-conductive layer and an insulated conductor and a molding to form an insulator, and then the molten insulator was cured and the mold was taken off to prepare a mold transformer including the insulated conductor, the semi-conductive layer, and the insulator.

At this time, the time required for curing the epoxy resin composition according to the present invention as an insulator was 12 hours or less.

Comparative Example 1: Conventional Epoxy Resin Composition Made of Bisphenol A and Tertiary Amine An epoxy resin composition was prepared in the same manner as in above Example 1 except that an epoxy resin, which is produced with a liquid bisphenol A having a weight of 170-190 per an epoxy functional group of 1 mole as a main material, was used, and polypropylene glycol (PPG) as a plasticizer, methyl tetrahydrophthalic anhydride (MeTHPA) as a curing agent, poly propylene glycol as a plasticizer, benzyldimethylamine (BDMA) which is tertiary amine as a catalyst.

Experimental Example 1: Property Analysis

The physical properties of an insulator made of an epoxy resin composition according to the present invention and an insulator made of a conventional epoxy resin composition were analyzed, and the results thereof are shown in Table 2 below.

TABLE 2

| | Example 1 | Comparative example 1 |
|---|---|---|
| curing time (h) | <12 | >20 |
| gelation time @140° C. (min) | 8 | 20 |

TABLE 2-continued

|  | Example 1 | Comparative example 1 |
|---|---|---|
| flexural strength [Mpa] | 150 | 140 |
| flexural elongation [%] | 1.6% | 1.4% |
| glass transition temperature | 70~90° C. | 70~90° C. |

As shown in Table 2, it can be seen that the overall gelation time of the insulator made of the epoxy resin composition of Example 1 is significantly shortened compared to the insulator made of the epoxy resin composition of Comparative Example 1. It can be seen that the gelation time, in particular, at 140° C. is very short, which is 8 minutes.

In addition, it can be seen that the insulator made of the epoxy resin composition of Example 1 according to the present invention has improved a flexural strength and a flexural elongation compared to an insulator made of a conventional epoxy resin composition, and because the plasticizer is not used, the glass transition temperature is not lowered.

In the above mentioned present invention, various substitutions, variations, and modifications are possible within a scope which does not deviate the technical idea of the present invention for those skilled in the art to which the present invention pertains, and thus, it is not limited by the above mentioned Examples and the accompanying drawings.

What is claimed is:

1. A curable epoxy resin composition comprising:
   15 to 25% by weight, based on the total weight of the composition, of an epoxy resin having a plasticized glycol-based functional group in a main chain of the epoxy resin;
   30 to 70% by weight, based on the total weight of the composition, of a filler, which allows for electrical insulation and thermal conductivity in the composition;
   10 to 20% by weight, based on the total weight of the composition, of a curing agent, which allows for a complete curing reaction of the epoxy resin; and
   0.001 to 0.1% by weight, based on the total weight of the composition, of an imidazole-based catalyst, which allows for a shortened curing reaction;
   wherein the plasticized glycol-based functional group of the epoxy resin is flexible and imparts a resistance to stress generated during the curing reaction; and
   wherein the composition does not comprise an additional plasticizer.

2. The composition of claim 1, wherein the epoxy resin has a molecular weight per equivalent of 300 to 400.

3. The composition of claim 1, wherein the plasticized glycol-based functional group has at least one repeating unit selected from the group consisting of ethyl glycol, methyl glycol, butyl glycol, and propyl glycol.

4. The composition of claim 1, wherein the imidazole-based catalyst is selected from the group consisting of 1-imidazole, 1-vinylimidazole, 1-ethylimidazole, 2-methylimidazole, 1-benzyl-2-phenylimidazole, 2-ethyl-4-methylimidazole and 1-cyanoethyl-2-ethyl-4-methylimidazole.

5. The composition of claim 1, wherein the curing agent in selected from the group consisting of methyl tetrahydrophthalic anhydride, methyl hexahydrophthalic anhydride, and nadic-methyl anhydride.

6. A transformer comprising:
   an insulated conductor wound in multiple layers in a vertical direction;
   a semi-conductive layer which is provided on the insulated conductor and disperses a concentrated electric field; and
   an insulator which is casted on the insulated conductor and the semi-conductive layer and forms an outer shape of the transformer,
   wherein the insulator is a cured product of the composition of claim 1.

7. The transformer of claim 6, wherein the epoxy resin has a molecular weight per equivalent of from 300 to 400.

8. The transformer of claim 6, wherein the plasticized glycol-based functional group has at least one repeating unit selected from the group consisting of ethyl glycol, methyl glycol, butyl glycol, and propyl glycol.

9. The transformer of claim 6, wherein the imidazole-based catalyst is selected from the group consisting of 1-imidazole, 1-vinylimidazole, 1-ethylimidazole, 2-methylimidazole, 1-benzyl-2-phenylimidazole, 2-ethyl-4-methylimidazole and 1-cyanoethyl-2-ethyl-4-methylimidazole.

10. The transformer of claim 6, wherein the curing agent in selected from the group consisting of methyl tetrahydrophthalic anhydride, methyl hexahydrophthalic anhydride, and nadic-methyl anhydride.

* * * * *